(12) United States Patent
Bidenbach et al.

(10) Patent No.: US 12,533,750 B2
(45) Date of Patent: Jan. 27, 2026

(54) DESCALING DEVICE FOR A TANK FOR TRANSPORTING/STORING A GAS IN THE LIQUID STATE

(71) Applicant: GAZTRANSPORT ET TECHNIGAZ, Saint Remy les Chevreuse (FR)

(72) Inventors: Michael Bidenbach, Saint Remy les Chevreuse (FR); Nicolas Laurain, Saint Remy les Chevreuse (FR); Sylvain Karst, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 986 days.

(21) Appl. No.: 17/610,826

(22) PCT Filed: May 13, 2020

(86) PCT No.: PCT/FR2020/050791
§ 371 (c)(1),
(2) Date: Nov. 12, 2021

(87) PCT Pub. No.: WO2020/229776
PCT Pub. Date: Nov. 19, 2020

(65) Prior Publication Data
US 2022/0212288 A1 Jul. 7, 2022

(30) Foreign Application Priority Data

May 15, 2019 (FR) ...................................... 19 05096

(51) Int. Cl.
*B23K 26/36* (2014.01)
*B23K 26/08* (2014.01)

(52) U.S. Cl.
CPC .......... *B23K 26/36* (2013.01); *B23K 26/0869* (2013.01)

(58) Field of Classification Search
CPC .............. B23K 37/0282; B23K 9/0206; B23K 2101/12; B23K 26/36; B23K 26/0869
(Continued)

(56) References Cited

U.S. PATENT DOCUMENTS

2009/0060780 A1* 3/2009 Walter ................. B08B 7/0042
422/186
2011/0210110 A1 9/2011 Dearman et al.

FOREIGN PATENT DOCUMENTS

| CN | 208644390 U | 3/2019 |
| EP | 2 164 077 A1 | 3/2010 |
| FR | 2 983 751 A1 | 6/2013 |

OTHER PUBLICATIONS

International Search Report issued on Oct. 6, 2020 in PCT/FR2020/050791 filed May 13, 2020, 2 pages.

* cited by examiner

*Primary Examiner* — Phuong T Nguyen
(74) *Attorney, Agent, or Firm* — Oblon, McClelland, Maier & Neustadt, L.L.P.

(57) ABSTRACT

A device for descaling a metallic membrane of a tank for transporting and/or storing gas in liquid form includes: a rail secured to the metallic membrane; a head projecting a laser beam to descale the metallic membrane; a support interposed between the projection head and the rail and traveling along the rail; and a device allowing a movement with respect to the metallic membrane of a point of impact of the laser beam on the metallic membrane, the movement being different from the travel effected by the support on the rail.

19 Claims, 10 Drawing Sheets

Figure 1:
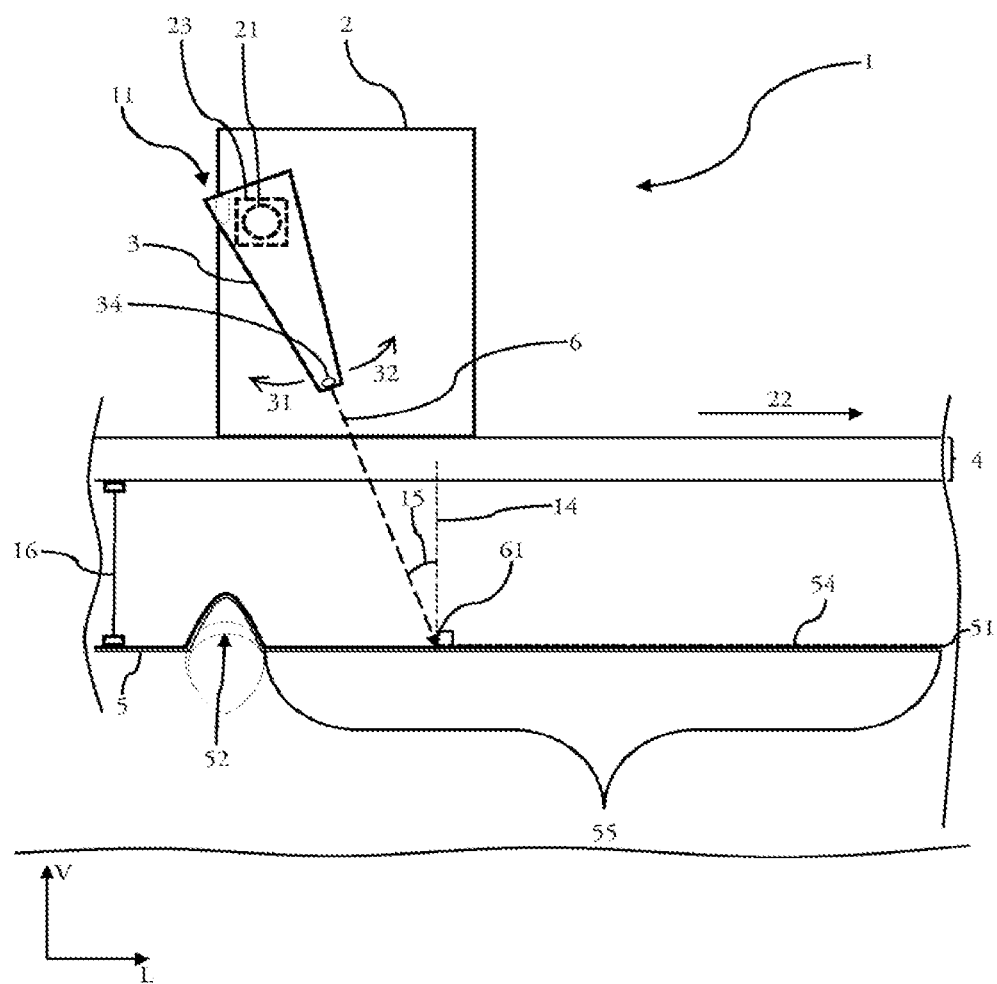

(58) Field of Classification Search
USPC .............................. 219/121.72, 136, 137 R
See application file for complete search history.

DESCALING DEVICE FOR A TANK FOR TRANSPORTING/STORING A GAS IN THE LIQUID STATE

The present invention relates to a device for descaling the metal membrane of a tank intended to contain a gas in liquid form. The invention relates to the field of the manufacture or maintenance of such a tank.

In the industry of transporting and/or storing gas in liquid form, it is known practice to use tanks whose structure ensures sealing and thermal protection functions. Such tanks comprise at least one metal membrane which ensures the sealing function. The metal membrane is composed of a plurality of metal sheets welded together in the construction of the tank. In a standard case, the use of stainless steel demands a descaling of the welds. Currently, this descaling of the metal membrane is performed manually, for example using a metal brush or by acid passivation.

In other situations, the metal membrane can rust or be soiled, for example during metal sheet welding operations or else when an event such as a failure of a dry air generator or when an accidental fire occurs, or even when there is some ingress of seawater, such an event then being the generator of a deposit on the membrane. Since the membrane is intended to come into contact with the gas in the liquid state, it is then essential to proceed with the descaling of the metal membrane of the tank in order to avoid any development of corrosion.

These two types of descaling take a long time to implement and involve significant financial means.

There are also possible laser projection heads capable of descaling a metal wall, but these are manual and are not suited to a use in a membrane tank for storing or transporting a gas in the liquid state. They do not therefore solve the problem of the loss of time spent in the descaling of the metal membrane.

The present invention makes it possible to proceed with the descaling of the metal membrane of a tank in an automated manner, while saving on time and financial resources.

The invention consists of a device for descaling a metal membrane of a tank for transporting and/or storing gas in liquid form comprising:
  at least one rail configured to be secured to the metal membrane,
  at least one projection head for projecting a laser beam configured to descale the metal membrane,
  at least one support interposed between the projection head and the rail and configured to be displaced along the rail,
characterized in that the descaling device comprises a means allowing a movement, with respect to the metal membrane, of a point of impact of the laser beam on the metal membrane, the movement being distinct from a displacement applied by the support on the rail.

Descaling of the metal membrane should be understood to mean the elimination, for example, of a layer impurities or of oxidation deposited on an inner face of the metal membrane, for example after a welding operation or else after pollution of the tank occurring on the worksite. The descaling device according to the invention is therefore configured to descale the metal membrane during the membrane manufacturing operations, for example the welding between two constituent sheets of this membrane, or after such manufacturing. In the latter case, the invention is very advantageous because it avoids having to raise a scaffolding inside the tank to reach the polluted zones.

The descaling device comprises the rail secured to the metal membrane. The rail can be fixed, for example by gripping particular forms of the membrane, such as, for example, the nodes which are formed at the intersections of the corrugations, when the membrane is provided therewith.

It is also possible to use an element of the metal membrane in order for the latter to serve as rail, for example a raised edge of the metal membrane such as that described hereinbelow. The rail can have a trajectory that is entirely straight or else curved.

The support is secured to the rail, for example by engagement at one end of the rail, and is configured to slide along the rail. The support can for example be electrically powered to apply a displacement dependent on the trajectory of the rail.

The laser beam projection head is linked to the support by any fixing means. It is thus driven by the support upon the displacement thereof on the rail.

The projection head is configured to project the laser beam whose characteristics are adapted for a metal membrane descaling operation, as presented hereinbelow. The laser beam is projected against a zone of the metal membrane to be descaled, forming the point of impact of the laser beam on the metal membrane. It is at this point of impact that the descaling is performed.

The movement of the point of impact of the laser beam can depend on the displacement of the support along the rail. In fact, since the projection head is borne by the support, the point of impact of the laser beam can follow the displacement of the support. The invention is recognizable in that it comprises the means allowing the movement of the laser beam projection head with respect to the support, when the latter is displaced along the rail. This definition excludes any movement occurring during an operation of mounting of the projection head on the support, during the manufacture or the maintenance of the descaling device. It is therefore understood that the point of impact of the laser beam is not exclusively guided by the displacement of the support along the rail.

The means allowing the movement of the projection head with respect to the support are varied. They can for example be means driving a movement of the projection head or of any other element acting on the trajectory of the laser beam, and doing so independently of the support. Thus, depending on the embodiment of the invention, the projection head can for example pivot or else translate, with respect to the support. The means is then a pivoting means and/or a translation means for pivoting or translating the projection head with respect to the support. In such an embodiment, the projection head can pivot and/or translate as freely as one degree of freedom of the means allowing the movement of the projection head can allow. It is also possible to parameterize the descaling device in order for the latter to allow only a limited number of positions of the projection head. In this embodiment, the means allowing the movement of the projection head is active only in the event of a change of position of the projection head. Alternatively or in addition, the means can comprise a reflecting surface which deflects the beam toward the membrane to be descaled. The reflecting surface can for example take the form of a reflecting module directly incorporated within the structure of the projection head and allowing the movement of the point of impact of the laser beam in at least two different planes, or else, for example, in the form of a mirror incorporated on the support and disposed on the trajectory of the laser beam emanating from the projection head.

The movement of the point of impact of the laser beam is performed according to the forms of the metal membrane or the type of descaling operation to be performed thereon. The details concerning the movement and the means allowing such a movement are presented in the course of the description of the invention.

According to a feature of the invention, the projection head is configured to project the laser beam with a beam power of between 20 W and 200 W. In order to ensure the descaling function without destroying the membrane, the projected laser beam is of sufficient power to effectively descale the inner face of the metal membrane onto which it is projected. The power of the laser beam has a maximum threshold value in order not to damage the metal membrane of the tank.

According to a feature of the invention, the projection head is configured to project the laser beam at a pulsing frequency of between 100 kHz and 250 kHz. According to a feature of the invention, the projection head is configured to project the laser beam at a pulsing frequency of between 100 kHz and 200 kHz. The laser projection head projects a so-called pulsed laser beam. A pulsed laser emits light pulses that make it possible to multiply the power of the laser during the pulsing while retaining identical energy consumption. The pulsings generate heat which assists in the descaling of the surface of the metal membrane. The pulsing frequency of the laser beam is thus between 100 kHz and 200 kHz. In other words, the projection head projects one pulse per time interval of between 5 and 10 microseconds.

According to a feature of the invention, the projection head is configured to project the laser beam at a wavelength of 1064 nm +/−5%.

According to a feature of the invention, the projection head comprises at least one focusing lens for focusing the laser beam. The fact of having the lens at the laser beam emission level makes it possible to increase its density. Thus, the laser descaling is more effective.

According to a feature of the invention, a focal distance of the focusing lens for focusing the laser beam is between 80 mm and 360 mm. The point of the laser beam where the light density is the highest corresponds to the focal distance of the lens, i.e. the distance separating the lens from said point. In other words, for optimal descaling, the distance between the lens and the zone of the metal membrane to be descaled should be identical or substantially identical to the focal distance of the lens, i.e. between 80 mm and 360 mm depending on the lens used.

According to a feature of the invention, the support is configured to be displaced on the rail at a speed of between 25 and 72 cm/min. Although the descaling device comprises the means allowing the movement of the point of impact of the laser beam distinct from the displacement of the support, the speed thereof plays a role in the movement of the point of impact of the laser beam. Thus, a displacement of the support at an excessively fast speed can generate a movement of the point of impact of the laser beam that is equally too fast, which provokes ineffective descaling. Conversely, a movement of the point of impact that is too slow can keep the latter at a certain point of the metal membrane and results in material damage thereto given the power of the laser beam. To avoid these two particular cases, the speed of displacement of the support must be maintained between 25 and 72 cm/min.

According to a feature of the invention, the means allowing the movement of the point of impact with respect to the support can be configured so that the projection head follows the profile complementing a profile of the metal membrane. As indicated previously, the movement of the point of impact of the laser beam is performed based on the forms of the metal membrane. Thus, the position of the projection head can be modified to adapt to the profile of the metal membrane in order for the descaling operation to be as effective as possible according to the situation.

According to a feature of the invention, the means allowing the movement of the point of impact can comprise a reflection module disposed within the projection head and configured to ensure the movement of the point of impact in at least two different planes. The reflection module is placed at an end of the projection head from which the laser beam emanates. The reflection module can for example take the form of a set of movable mirrors ensuring the orientation of the laser beam at the output of the projection head as required. The reflection module thus allows the movement of the point of impact of the laser beam in at least two different planes. In other words, the movement of the point of impact with respect to the metal membrane can be performed in a plurality of directions limited by the capabilities of the reflection module.

According to a feature of the invention, the means allowing the movement of the point of impact is configured to incline the projection head by an angle of incidence of between 5° and 70° with respect to a normal to the metal membrane. In other words, the projected laser beam reaches the surface to be descaled according to an angle of incidence of between 5° and 70°. Such an inclination is of benefit when the metal membrane to be descaled is, for example, the metal membrane of a tank for transporting and/or storing a gas in liquid form of Mark type.

According to a feature of the invention, the projection head can be configured to adopt at least one fixed position of inclination with respect to the normal to the metal membrane. The projection head can be parameterized to allow only a certain number of positions which differ as a function of the angle of inclination of the projection head. Thus, these positions remain fixed, the movement of the point of impact of the laser beam depends entirely on the displacement of the support along the rail. In other words, the means allowing the movement of the point of impact with respect to the metal membrane distinct from the displacement of the support along the rail is active only when the projection head passes from one fixed position to another when it is configured to adopt at least two fixed positions.

According to a feature of the invention, the descaling device is configured to descale at least one weld bead of the metal membrane. The weld bead formed after the metal membrane welding operation must be descaled. The welding operation can, for example, be performed at a junction between two metal plates of the metal membrane in order to secure them. Such a welding operation results in the appearance of the weld bead, and, inevitably, of the layer of impurities and/or of oxidation provoked by a welding apparatus. Such a layer of impurities and/or of oxidation must be eliminated before the tank is put into service. The passage of the descaling device, more particularly of the laser beam, over the weld bead, makes it possible to eliminate the layer of impurities and/or of oxidation from the weld bead.

According to a feature of the invention, the support can bear at least one welding head. Thus, the descaling device performs the two operations simultaneously, namely the welding of the metal membrane, then the descaling of the weld bead formed by the welding head. The two heads are therefore disposed one behind the other, the projection head being disposed after the welding head with respect to the displacement of the support on the rail.

According to a feature of the invention, the means allowing the movement of the point of impact is configured to separate this point of impact of the laser beam from a welding arc formed by the welding head by a distance greater than or equal to 80 mm. Since the welding operation is performed at high temperature, the weld bead newly formed following the welding operation is at a temperature of several hundreds of degrees. In order to avoid the creation of a new layer of oxides during the descaling, the temperature of the weld bead must be lower than 150° C. before the laser beam passes over it. For that, a distance of at least 80 mm must be applied between the welding arc of the welding head and the point of impact of the laser beam, in order for the weld bead to be cold enough.

According to a feature of the invention, the metal membrane can comprise at least one corrugation, the means allowing the movement of the point of impact being configured so that the projection head projecting the laser beam follows a profile of the corrugation of the metal membrane. The presence of the corrugation on the metal membrane of the tank allows the deformation thereof when the vessel which bears it is moving. When the metal membrane comprises at least the corrugation, and the welding head forms the weld bead covering the form of the corrugation, the descaling operation proves to be more difficult than for the descaling of a flat section of the metal membrane. The means allowing the movement mitigates this difficulty by pivoting or translating the projection head so that the latter, more particularly the end from which the laser beam emanates, follows the form of the corrugation and effectively descales the corrugation of the metal membrane. The pivoting can for example be performed using a rotation shaft disposed between the projection head and the support, and by a motor incorporated in the projection head or in the support. Such an organization makes it possible to maintain an angle of incidence of the laser beam on the membrane, even when there are corrugations present.

According to a feature of the invention, the descaling device can comprise at least two projection heads projecting a laser beam on one and the same support. In this embodiment, the descaling device comprises a plurality of projection heads. Each of the projection heads projects its own laser beam and can pivot by virtue of the means allowing the movement which is specific to it.

According to a feature of the invention, a first projection head is oriented by an angle of between 5° and 70° measured in a counterclockwise direction and a second projection head is oriented by an angle of between 5° and 70° measured in a clockwise direction. In other words, the projection heads are oriented so that, when the metal membrane is flat, the projection heads each project their laser beam forming only a single point of impact contacting the metal membrane. When the laser beams from the projection heads cover the corrugation of the metal membrane, each of the projection heads projects its laser beam onto a portion of the corrugation relative to the orientation of each of said projection heads. Such an arrangement of the projection heads makes it possible to avoid excessively extreme movements within the descaling device. Moreover, it is possible to limit the energy consumption of the descaling device by stopping the projection of the laser beam from the first projection head or from the second projection head when one of them is at the portion of the corrugation descaled by the other projection head.

According to a feature of the invention, the means which provoke the movement of the point of impact of the laser beam with respect to the metal membrane can comprise at least one reflecting device on which the laser beam from the projection head is reflected toward the metal membrane. In this embodiment, the projection head is fixed and projects the laser beam without the possibility of pivoting thereof. It is the reflecting device, disposed on the trajectory of the laser beam, which deflects the laser beam by direct reflection, and returns it toward the metal membrane. The pivoting of the reflection device can for example be performed using a motor and a rotation shaft.

According to a feature of the invention, the support can take the form of a gantry overhanging the metal membrane. In this embodiment, the gantry serves as support and can for example comprise two uprights extending on either side of the zone of the metal membrane to be descaled. The projection head thus overhangs said zone of the metal membrane from the gantry as is described hereinbelow.

According to a feature of the invention, the metal membrane can comprise at least two metal strips joined to one another by at least one raised edge, the rail being formed by at least one of the raised edges, and advantageously by both the raised edges, the projection head being configured to descale at least one of the raised edges. Contrary to the preceding embodiments, in which the rail is distinct from the membrane and secured to the tank by any fixing means, here it is the raised edge of the metal membrane which serves as the rail. This embodiment thus avoids the addition of the rail, and the mounting thereof and the dismantling thereof once the descaling operation is completed. This embodiment is more particularly applicable for example for a tank with metal membranes of NO96 type.

According to a feature of the invention, the support can be driven along the rail by a driving member comprising at least one wheel bearing against the rail and at least one roller bearing on a flat section of the metal membrane. In other words, the driving member, when the latter is in operation, allows the displacement of the gantry along the raised edge, or more generally the displacement of the support along the rail. The wheel bears on the raised edge in order to follow the trajectory of the raised edge. The wheel can be rotated by an electric motor, thus driving the rotation of the wheel. The roller bears on the flat section of the metal membrane and the fact that it is rotated by the wheel guarantees the displacement of the gantry on the metal membrane, along the raised edge thereof.

According to a feature of the invention, the means allowing the movement of the point of impact comprises a device for translating the projection head on a runner interposed between two uprights of the gantry. The runner serves to mechanically maintain and slide the projection head over the metal membrane. The runner can for example be interposed between two uprights of the support thus forming the gantry.

According to another feature, the means comprises a toothed wheel secured to the projection head and a worm screw. The latter can extend from one upright to the other of the support. The projection head comprises the toothed wheel, for example a nut, which can be fixed with respect to the projection head. Alternatively, the worm screw can be fixed and it is the toothed wheel which is rotated, thus driving a translation of the projection head.

The toothed wheel can thus translate along the worm screw in driving the projection head in its travel. The association between the worm screw and the toothed wheel forms a constituent subassembly of the means allowing the movement of the laser beam projection head. Thus, the projection head is capable of performing a to-and-fro movement in a direction other than a direction of displacement of the gantry, notably at right angles to that direction of displacement. The combination of the displacement of the gantry and of the translational movement of the projection head allows a complete descaling of the section of the metal membrane delimited by the gantry. Alternatively, the toothed wheel can also be disposed in a metal arm which slides on the runner and bears the projection head, creating a descaling between the latter and the gantry. This alternative allows the projection head to descale certain zones of the metal membrane without the gantry hampering the descaling operation by forming an obstacle between the laser beam and the metal membrane.

By virtue of the reflection module described previously, the projection head, when the latter is situated at one of the ends of the worm screw, can project a laser beam whose trajectory is modified by the reflection module in order to descale the raised edge serving as rail for the gantry, despite the fact that the projection head is not vertically centered on the raised edge. This is an advantageous function of the reflection module because the raised edge is an element of the metal membrane that is particularly tedious to descale. More generally, and as has been described previously, the reflection module allows the point of impact of the laser beam to move in at least two different planes, for example at right angles to one another. Thus, the point of impact of the laser beam can cover a zone of the metal membrane extending in two different planes, and do so without the need for movement of the projection head along the worm screw.

According to a feature of the invention, the projection head is at a constant distance from the metal membrane. In this embodiment, the function of the descaling device is to descale the flat section of the metal membrane.

The invention also covers a method for descaling a metal membrane of a tank for transporting and/or storing gas in liquid form, implementing a descaling device as presented previously, and comprising:

- a step of placement of the support on the rail in a zone of the metal membrane to be descaled,
- a step of activation of the laser beam projection head,
- a step of moving of the point of impact of the laser beam with respect to the metal membrane,
- a step of displacement of the support on the rail.

The last three steps set out above can be performed in succession and in any order. Alternatively, these last three steps can be performed simultaneously.

According to a feature of the invention, the descaling method can comprise a step of interruption of the laser beam when the projection head is positioned at 0°+/−1° with respect to the normal to the metal membrane. As indicated previously, the means allowing the movement of the point of impact is configured to incline the projection head according to an angle of incidence of between 5° and 70°. This angle of inclination, beyond facilitating the descaling of the corrugation of the metal membrane, makes it possible to avoid direct reflections on the projection head and causing damage thereto. However, since the means allowing the movement of the point of impact may in certain cases drive the pivoting of the projection head, the latter, in its operation, will be at least occasionally positioned at 0°+/−1° with respect to the normal. This event can occur when the descaling device descales a top of the corrugation or the projection head pivots to be readjusted after the descaling of the corrugation. Thus, the projection head can, for example, comprise a sensor capable of interrupting the laser beam each time the projection head is positioned at 0°+/−1° with respect to the normal to the metal membrane. This additional step in the descaling method makes it possible to avoid damaging the projection head. It is understood that this angle is measured between the direction of the laser beam and the normal to the metal membrane taken at the point of impact.

Figure 2:
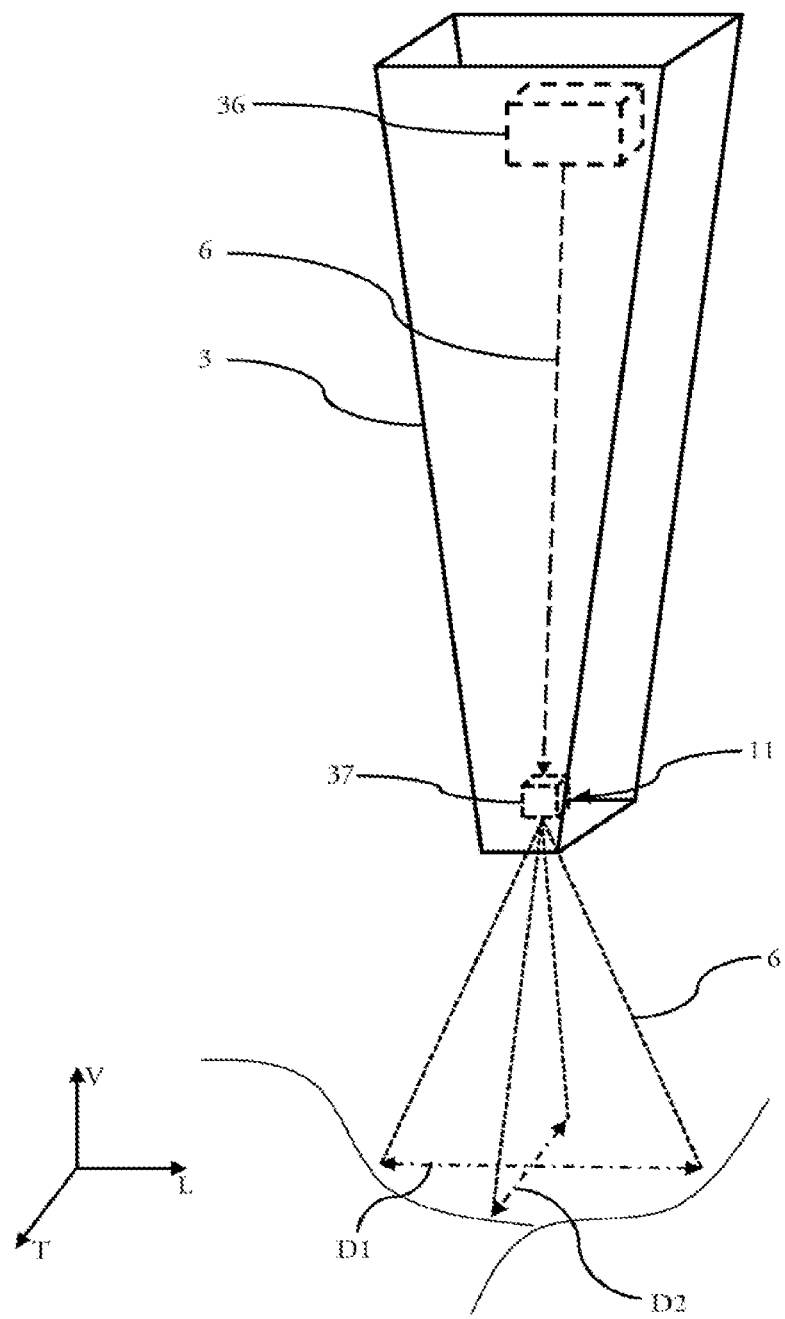
Figure 3:
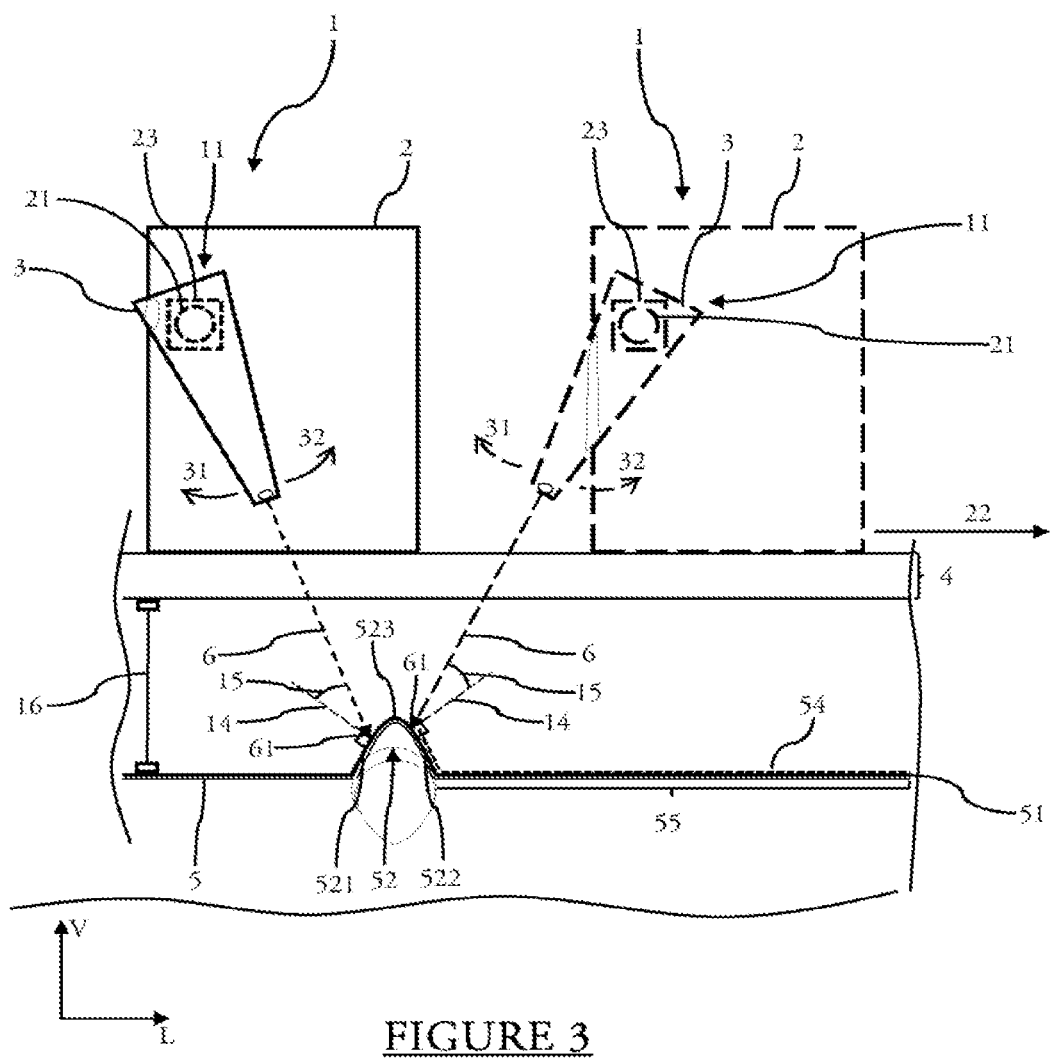
Figure 4:
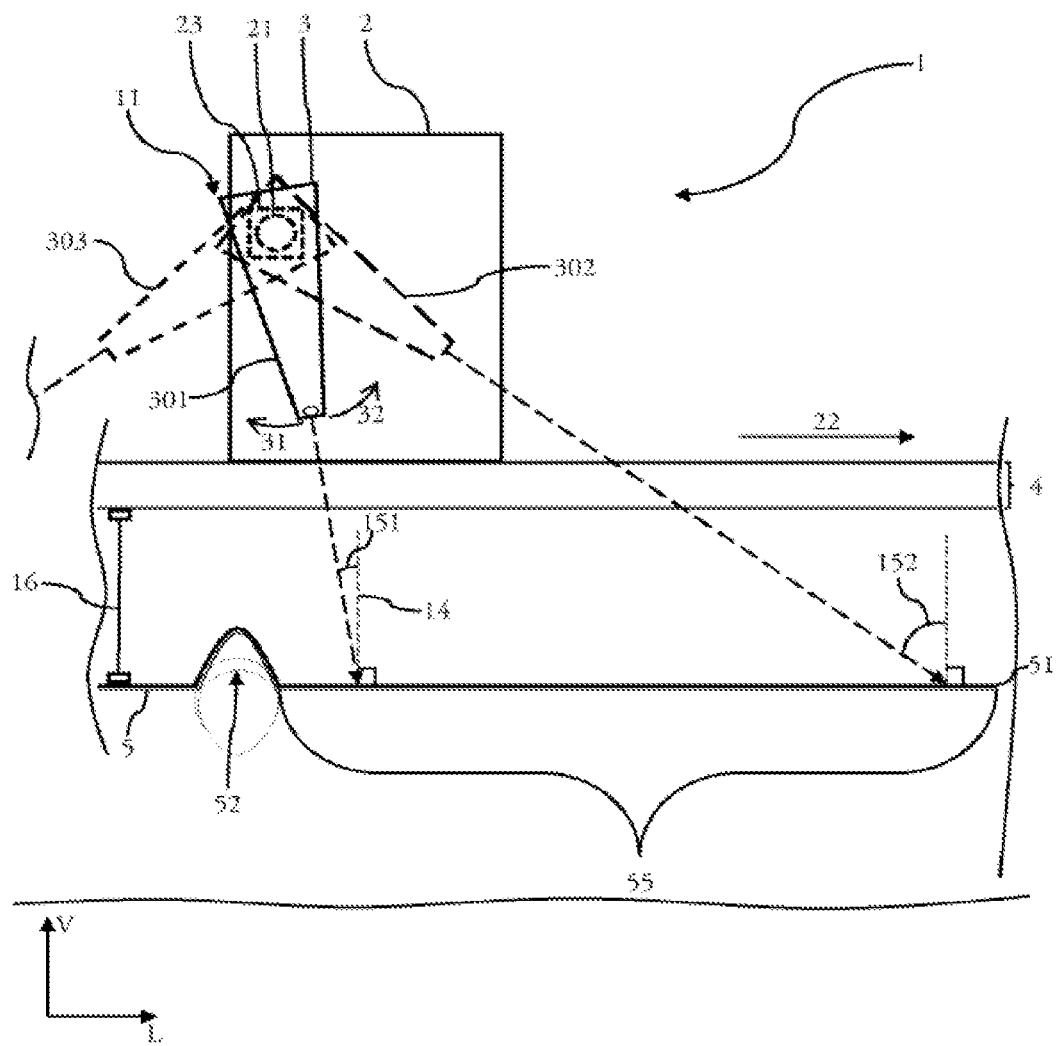
Figure 5:
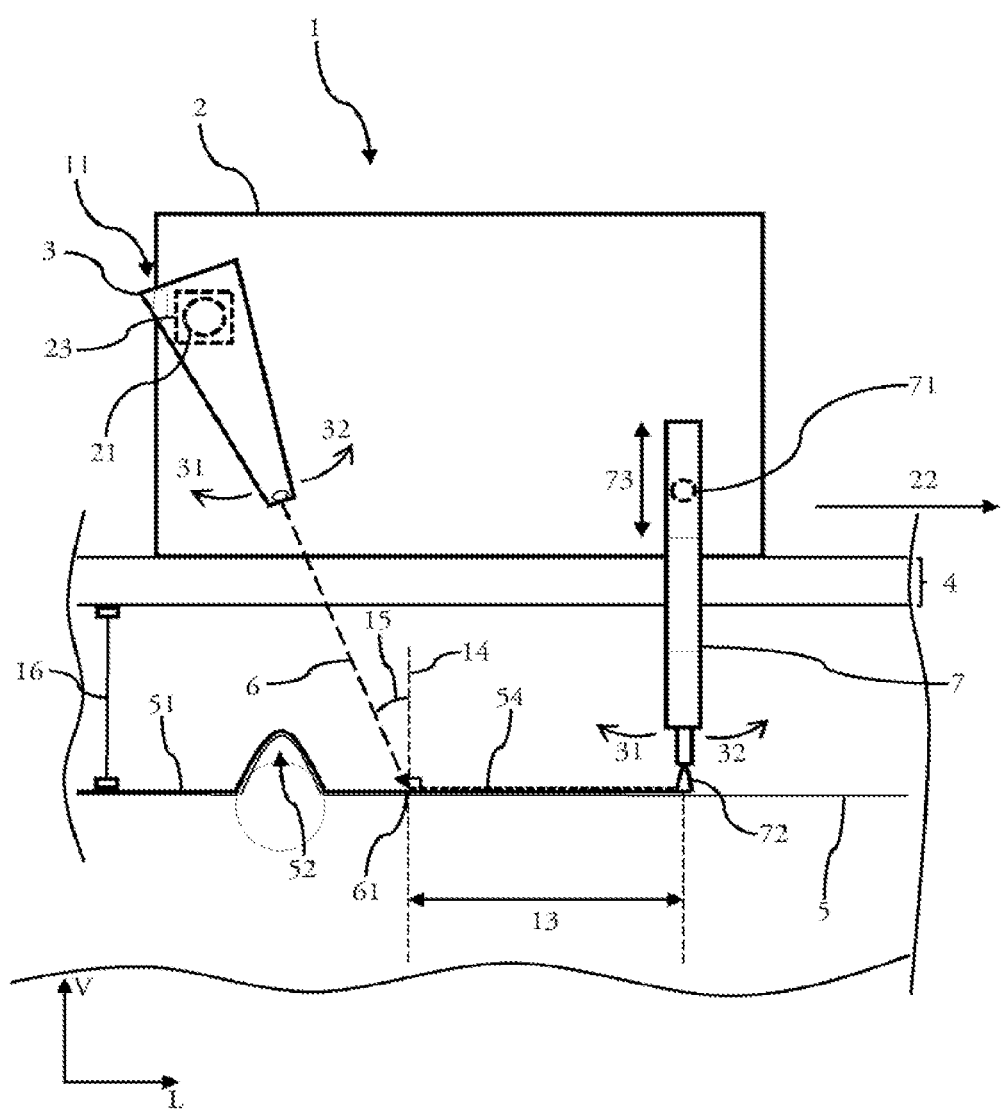
Figure 6:
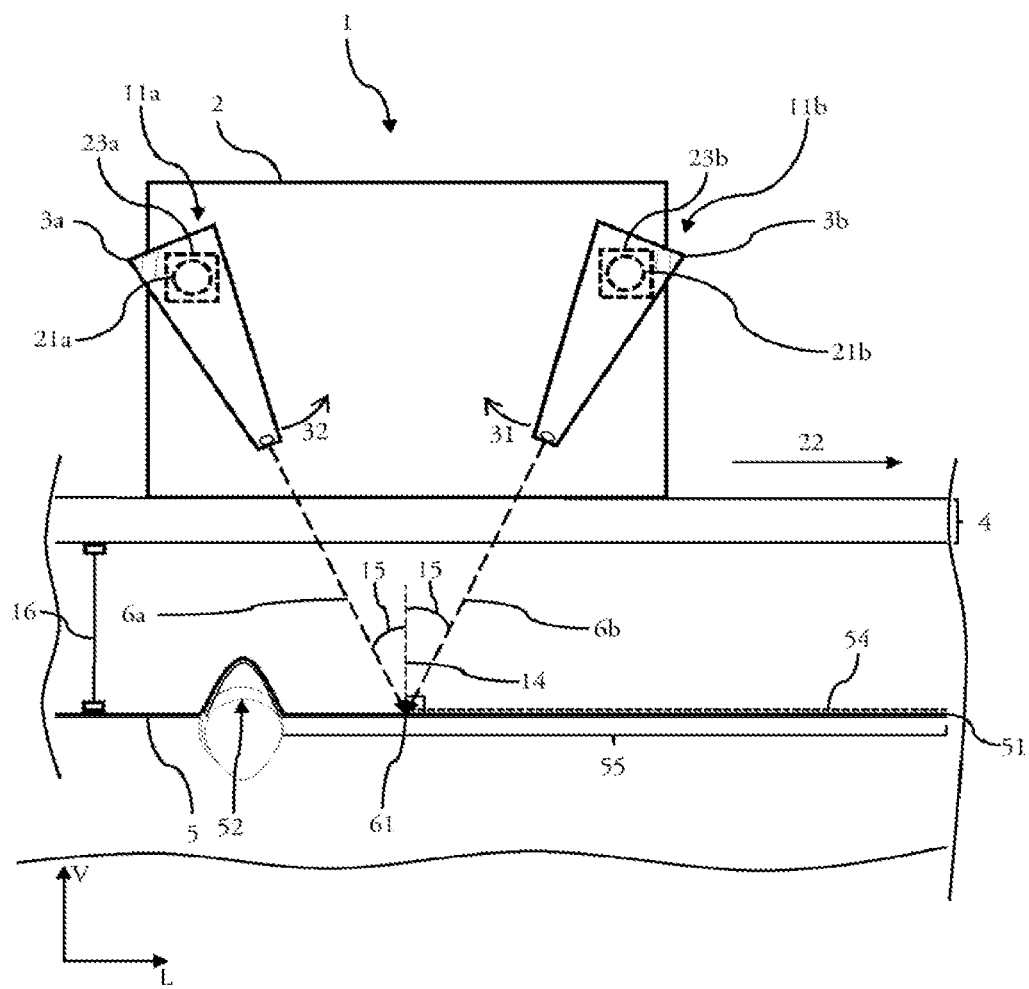
Figure 7:
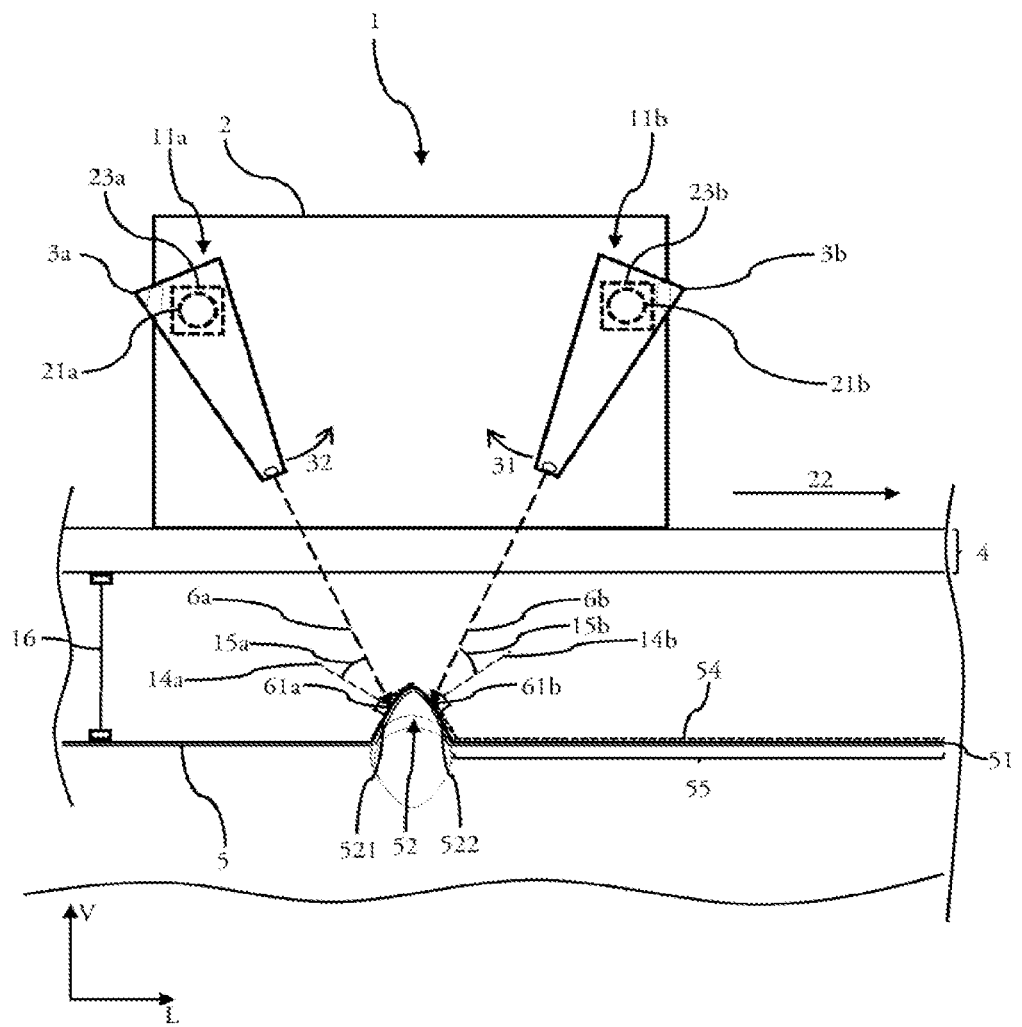
Figure 8:
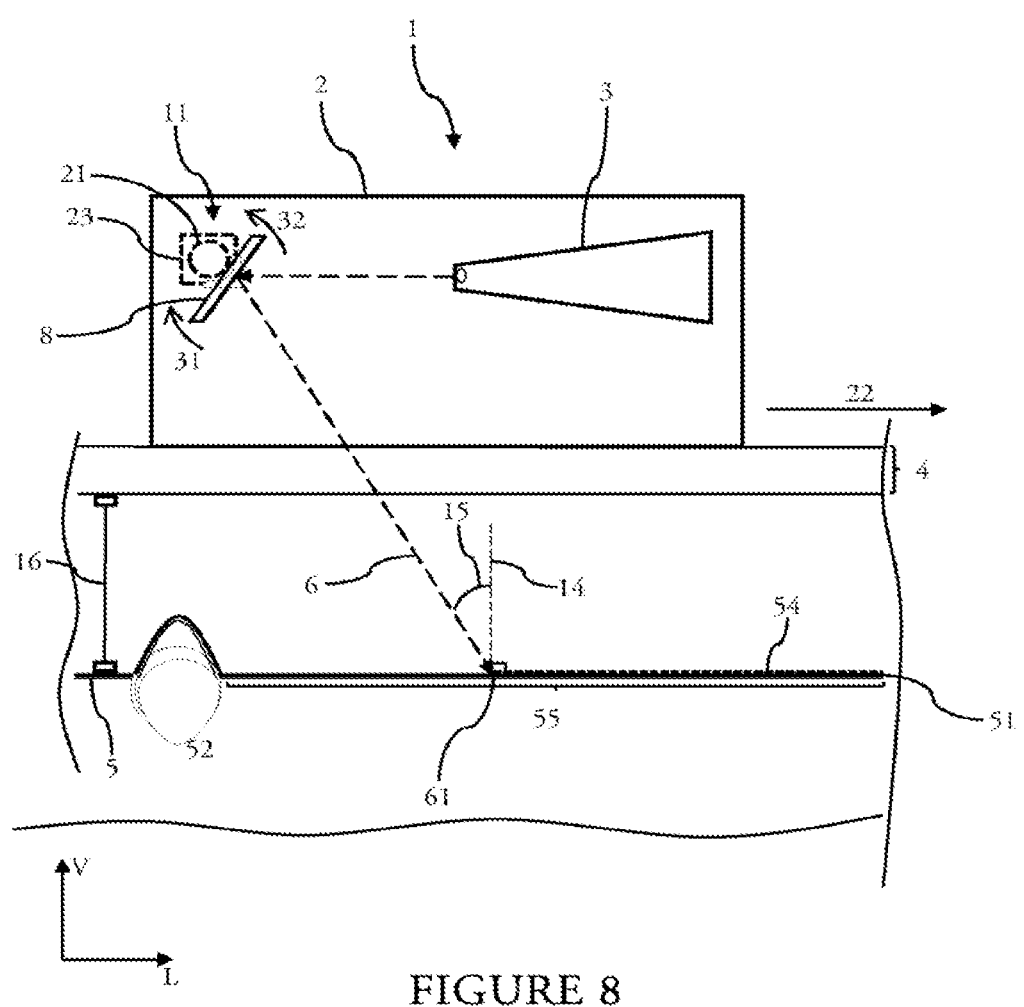
Figure 9:
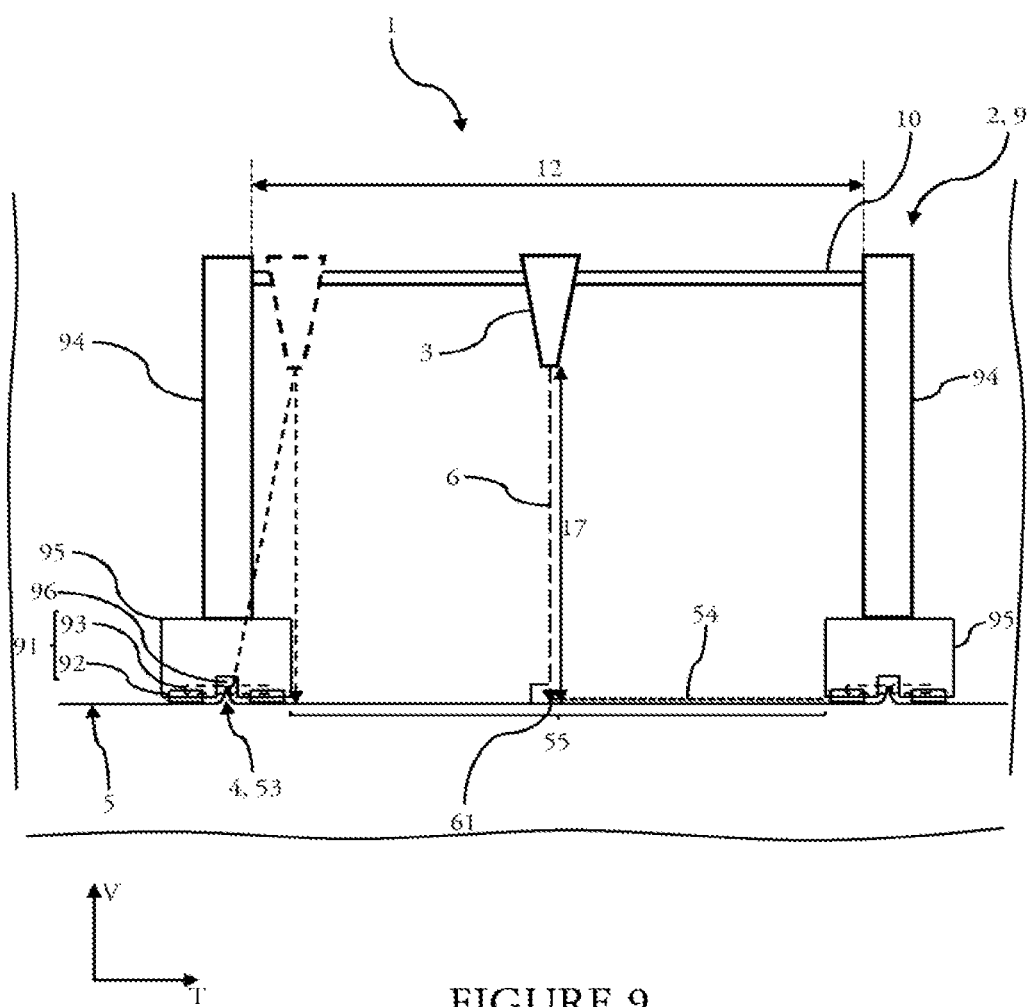
Figure 10:
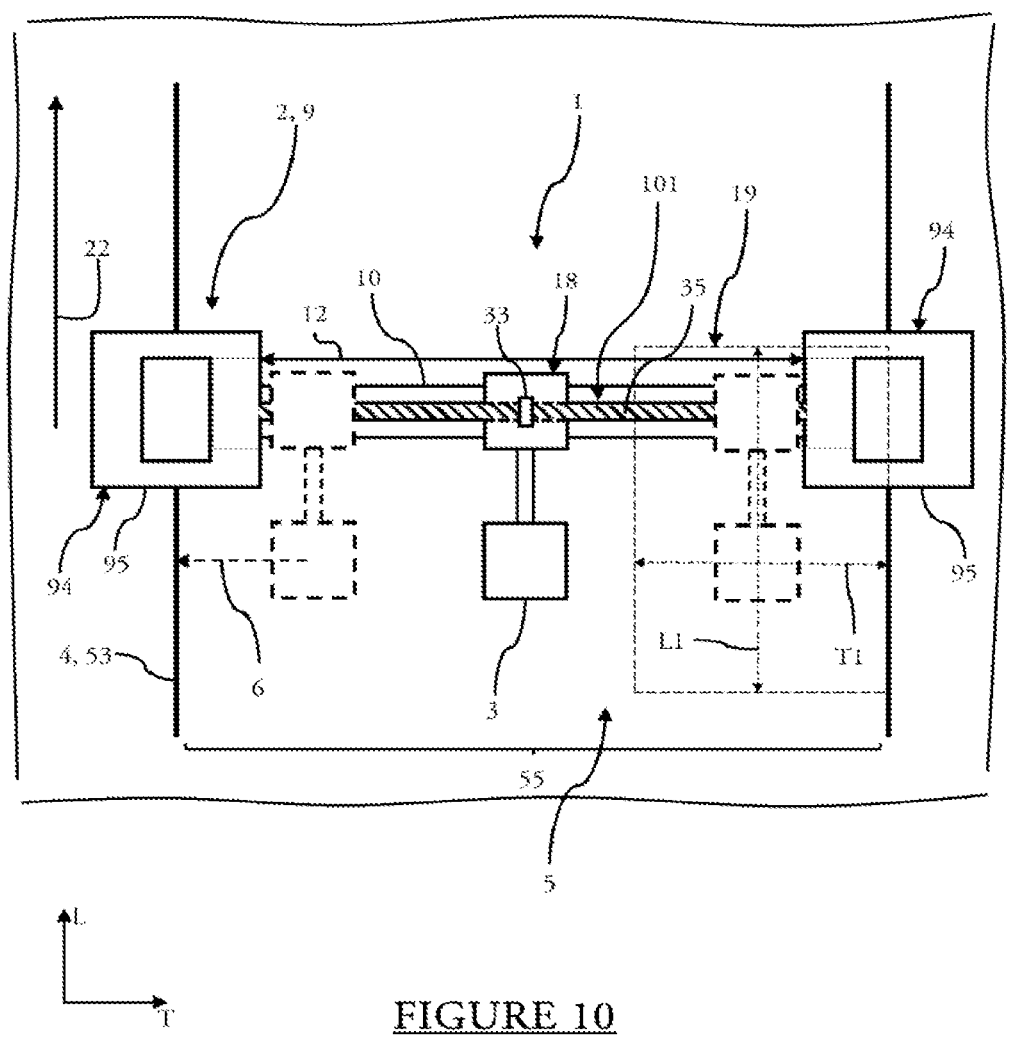

Other features and advantages of the invention will become more apparent from the following description on the one hand, and from several exemplary embodiments given in an indicative and nonlimiting manner with reference to the attached schematic drawings on the other hand, in which:

FIG. 1 is a schematic representation of a first embodiment of the descaling device according to the invention, FIG. 2 is a representation of a projection head comprising a reflection module, FIG. 3 illustrates the descaling device according to the first embodiment in two different positions, FIG. 4 is a schematic representation of a second embodiment of the descaling device according to the invention, FIG. 5 is a schematic representation of a third embodiment of the descaling device according to the invention, FIG. 6 is a schematic representation of a fourth embodiment of the descaling device according to the invention, FIG. 7 is a schematic representation of the fourth embodiment of the descaling device when the latter descales a corrugation of the metal membrane, FIG. 8 is a schematic representation of a fifth embodiment of the descaling device according to the invention, FIG. 9 is a schematic representation of a sixth embodiment of the descaling device according to the invention, FIG. 10 is a top view of the sixth embodiment.

In the description below of the descaling device and of the elements of which it is composed, the references LV, VT and LT represent the orientation of the various elements of the detailed description. The longitudinal direction L corresponds to an axis parallel to a weld bead formed on the metal membrane or to a raised edge of the metal membrane, the vertical direction V corresponds to a vertical axis, and the transverse direction T corresponds to an axis at right angles to the longitudinal axis L and to the vertical axis V.

FIG. 1 represents a descaling device 1 disposed on a metal membrane 5 of a tank for an onshore or floating structure. The metal membrane 5 forms a sealing barrier to the gas in the liquid state that the tank contains.

The metal membrane 5 comprises at least one flat section 55, extending on a longitudinal axis L, and at least one corrugation 52 which, as an indication, makes it possible to allow the deformations of the tank. Obviously, the metal membrane 5 comprises several series of corrugations which cross at right angles.

The descaling device 1 comprises a rail 4, a projection head 3 and a support 2 interposed between the projection head 3 and the rail 4. The rail 4 is secured to the metal membrane 5 through link feet 16 fixed for example to the nodes that are formed at the intersection of the corrugations.

In FIG. 1, the descaling device 1 is intended to descale a layer of impurities or of oxidation 54 formed on a weld bead 51 of the metal membrane 5. The weld bead 51 can for example be formed by a welding robot, independently of the descaling device 1 and not represented in FIG. 1. Thus, the rail 4 is secured to the metal membrane 5 so as to be displaced parallel to the weld bead 51, in order for the descaling device 1 to be able to descale the layer of impurities or of oxidation 54 formed on the weld bead 51.

The support 2 is secured to the rail 4, for example by the fitting of forms complementing that of the rail 4. The support 2 is electrically powered and comprises a displacement device for being displaced on the rail 4, in a direction parallel to the longitudinal axis L and illustrated by an arrow 22. To simplify the detailed description and for all of the figures, the displacement of the support is illustrated in a single direction, but it is clear that the support can be displaced in a first direction illustrated by the arrow 22 or in a direction opposite to that illustrated by the arrow 22.

The displacement of the support 2 is established at a speed that varies as required, the speed nevertheless being between 25 and 72 cm/min for all of the embodiments according to the invention.

The support 2 comprises a rotation shaft 21 extending to the projection head 3. The rotation shaft 21 has a main dimension of extension such that the projection head 3 overhangs the weld bead 51. In FIG. 1, the projection head 3 has a truncated pyramid form. It is however obvious that, as long as the projection head 3 ensures its functions, it can have another form.

Through its features, the projection head 3 is configured to project a laser beam 6 capable of descaling the weld bead 51. Thus, the projection head 3 comprises a beam generator, not represented in FIG. 1, capable of emitting a laser beam 6. In order to address the descaling function, and for all of the figures, the projection head 3 is configured to project the laser beam 6 at a laser beam power of between 20 W and 200 W, at a pulsing frequency of between 100 kHz and 250 kHz and having a wavelength of 1064 nm +/−5%.

As an example for a steel of 304L type in membrane form with a thickness of 1 to 1.5 mm, the laser beam 6, at a power of 100 W +/−20%, at a pulsing frequency of 200 kHz +/−5% and having a wavelength of 1064 nm +/−%, has demonstrated its effectiveness for the descaling.

According to another example for an iron alloy with 36% nickel used in membrane form with a thickness of 1 to 1.5 mm, the laser beam 6, at a power of 100 W +/−20%, at a pulsing frequency of 150 kHz +/−5% and having a wavelength of 1064 nm +/−5%, has demonstrated its effectiveness for the descaling of a surface with generalized corrosion.

The projection head 3 can comprise one or more focusing lenses 34 for focusing the laser beam 6, with a focal distance of between 80 mm and 360 mm. The laser beam 6 extends from the projection head 3 to reach the weld bead 51, at a point of impact 61. It is at this point of impact 61 that the layer of impurities or of oxidation 54 is eliminated from the weld bead 51 which is thus descaled. With the support 2 being displaced on the rail 4 according to the displacement 22, the projection head 3 is thus driven by the support 2 by traveling over a trajectory of the weld bead 51. The laser beam 6 is thus projected to the point of impact 61 which, through the displacement of the support, travels along the weld bead 51, gradually eliminating the layer of impurities or of oxidation 54.

As an example for a steel of 304L type in the form of a membrane with a thickness of 1 to 1.5 mm, the focal distance is 330 mm +/−10 mm.

According to another example for an alloy of iron with 36% nickel used in the form of a membrane with a thickness of 1 to 1.5 mm, the focal distance is 330 mm +/−10 mm.

The projection head 3 comprises an electric motor 23 linked to the rotation shaft 21. The electric motor 23 is configured to pivot the rotation shaft 21, thus driving the pivoting of the projection head 3 by a clockwise movement 31 or by a counterclockwise movement 32. The association between the electric motor 23 and the rotation shaft 21 thus forms a means 11 allowing a movement with respect to the metal membrane 5 of the point of impact 61 of the laser beam 6 on this metal membrane 5. This movement is distinct from the displacement of the support 2 on the rail 4, as illustrated by the arrow 22. In other words, the movement with respect to the metal membrane 5 allows a position of the point of impact 61 of the laser beam 6 on the metal membrane 5 to be modified independently of the displacement 22 of the support 2. It is therefore possible according to the invention for the point of impact 61 of the laser beam 6 not to move along the weld bead 51 at the same speed as the speed of displacement 22 of the support 2.

The means 11 allowing the movement of the projection head 3 is useful in several particular cases. It notably makes it possible to implement an inclination of the projection head 3, and therefore of the laser beam 6, with respect to a normal 14 to the metal membrane 5. The normal 14 to the metal membrane 5 is a virtual straight line at right angles to the general plane of extension of the metal membrane 5.

During the operation of the descaling device 1, the projection head 3 is inclined according to an angle of incidence 15 of between 5° and 70°, with respect to the normal 14 to the metal membrane 5. These angle values guarantee the effectiveness of the abrasion effect generated by the laser beam.

The laser beam 6 therefore enters into contact with the metal membrane 5 according to the angle of incidence 15, equal to the inclination of the projection head 3. The angle of incidence 15 makes it possible to avoid a direct reflection of the laser beam 6 on the weld bead 51 toward the projection head 3, thus creating a risk of damage to the projection head 3 given the power of the laser beam 6.

The means ii which implements the movement of the projection head 3 with respect to the support 2 is also useful when the descaling device 1 descales the corrugation 52 of the metal membrane 5, as is described hereinbelow.

FIG. 2 represents the projection head 3 in more detail, particularly in the structure thereof. The trihedron LVT represents the orientation of the constituent elements of FIG. 2.

The projection head 3 comprises the beam generator 36 which generates the laser beam 6, and whose operation is known. The laser beam 6 is thus projected toward a reflection module 37. In FIG. 2, the reflection module 37 is represented schematically, but can, for example, correspond to a set of mirrors. The reflection module 37 is disposed at an end of the projection head 3 from which the laser beam 6 emanates. In other words, the laser beam 6 is reflected or not by the reflection module 37 before emanating from the projection head 3. The reflection module 37 makes it possible to deflect the trajectory of the laser beam 6 at the output of the projection head 3, thus generating a laser beam 6 that is deflected with respect to the trajectory that it would have at the output of the beam generator 36. The reflection module 37 is therefore capable of modifying the movement of the point of impact of the laser beam 6, thus forming an element of the means 11 allowing the movement of the point of impact of the laser beam 6 with respect to the metal membrane.

In this example, the movement of the point of impact can be ensured on two different planes. The point of impact can in fact be moved on a plane LV formed by the longitudinal axis L and a vertical axis V, corresponding to a direction D1, or else on a plane TV formed by a transverse axis T and the vertical axis V, corresponding to a direction D2. The directions D1 and D2 can extend as far as the deflection of the laser beam 6 by the reflection module 37 can permit. The point of impact of the laser beam 6 can thus cover a zone of the metal membrane without the need for movement of the projection head 3.

The reflection module 37 can be present in the projection head 3 of each of the embodiments presented according to the invention, except for one of them as is specified hereinbelow.

FIG. 3 is a representation of the descaling device 1 according to the first embodiment when the latter descales the corrugation 52 of the metal membrane 5. The corrugation 52 is divided into two portions: a rising portion 521 and a descending portion 522, seen according to the direction of displacement 22.

Like the flat section 55, the corrugation 52 comprises the weld bead 51. The descaling device 1 therefore descales the corrugation 52 and the point of impact 61 of the laser beam 6 covers the corrugation 52, running along the rising portion 521 and the descending portion 522. This corrugation profile modifies the orientation of the normal 14 to the metal membrane 5, which remains at right angles to the metal membrane 5 at the corrugation 52. The modification of the orientation of the normal 14 to the metal membrane 5 at the corrugation 52 also modifies the value of the angle of incidence 15. In order for the projection head 3 to be maintained at an angle of incidence of between 5° and 70° when the point of impact 61 of the laser beam 6 covers the corrugation 52, the means 11 allowing the movement, here the electric motor 23 associated with the rotation shaft 21, ensures the pivoting of the projection head 3 in the clockwise direction 31 or in the counterclockwise direction 32, as required.

FIG. 3 shows the descaling device 1 in solid lines and the same descaling device 1 in dotted lines, symbolizing the position of the descaling device 1 during its displacement over the metal membrane 5. In FIG. 3, the descaling device 1 descales a fraction of the weld bead 51 situated on the rising portion 521 of the corrugation 52, then descales a fraction of the weld bead 51 of the descending portion 522 of the corrugation 52. During the travel of the point of impact 61 of the laser beam 6 over the fraction of the weld bead 51 situated on the corrugation 52, the means 11 pivots the projection head 3 in order for the latter to follow the profile of the corrugation 52. The fraction of the weld bead 51 situated on the corrugation 52 is then covered entirely by the point of impact 61 of the laser beam 6, the latter being constantly oriented according to the appropriate angle of incidence 15. Given that the projection head 3 follows the form of the corrugation 52, the projection head 3, more particularly the end from which the laser beam 6 emanates, is permanently oriented toward the corrugation 52 as FIG. 3 illustrates.

During the descaling of the corrugation 52, the projection head 3 necessarily pivots to be positioned as required at 0°+/−1° with respect to the normal 14 to the metal membrane 5. In this positioning, there is a risk of reflection of the laser beam 6 against the weld bead 51, returning the laser beam 6 toward the projection head 3 and risking damager thereto. This positioning can for example occur at the moment when the descaling device 1 descales a top 523 of the corrugation 52. In this situation, the descaling device 1 can for example comprise a sensor, not represented in FIG. 3, configured to detect the positioning at 0°+/−1° of the projection head 3, and interrupt the projection of the laser beam 6 in order to avoid damaging the projection head 3.

FIG. 4 represents a second embodiment of the descaling device 1. In this embodiment, the descaling device 1 is parameterized so that the projection head 3 adopts a plurality of fixed positions. Thus, by way of example, the projection head 3 according to FIG. 4 has three fixed positions:

a first position 301, oriented according to a first angle of incidence 151 with respect to the normal 14 to the metal membrane 5. The first angle of incidence 151 has a value of between 5° and 15° in the counterclockwise direction 32. The first position 301 is used when the descaling device 1 descales the flat section 55 of the metal membrane 5, a second position 302, oriented according to a second angle of incidence 152 with respect to the normal 14 to the metal membrane 5. The second angle of incidence 152 has a value of between 45° and 70° in the counterclockwise direction 32. The second position 302 is used when the descaling device 1 descales the rising portion 521 of the corrugation 52 of the metal membrane 5, a third position 303, oriented according to a third angle of incidence with respect to the normal 14 to the metal membrane 5. This third angle of incidence is not represented in FIG. 4, but its value is identical to the value of the second angle of incidence 152, that is to say a value of between 45° and 70°. On the other hand, contrary to the second angle of incidence 152, the third angle of incidence is oriented in the clockwise direction 31. The third position 303 is used when the descaling device 1 descales the descending portion 522 of the corrugation 52 of the metal membrane 5.

Thus, the projection head 3 is configured to adopt one of the three positions presented above as required. The means 11 is then active only when the projection head 3 passes from one of the fixed positions to another. Just as for the preceding embodiment, the laser beam 6 can be interrupted when the projection head 3 is positioned at 0°+/−1° with respect to the normal 14 to the metal membrane 5. It is obvious that this particular case occurs only in a case of a transition from one of the fixed positions to another.

FIG. 5 represents a third embodiment of the descaling device 1. In this embodiment, the descaling device 1 has all the same elements as the first embodiment. The descaling device 1 also comprises a welding head 7, linked to the support 2 by an arm 71. The arm 71 has a main dimension such that the welding head 7 overhangs a junction of two metal sheets of the metal membrane 5 where a welding join has to be produced.

The welding head 7 is guided by the support 2 applying the displacement 22, while being configured to generate a welding arc 72, the latter being generated at the junction between two metal sheets of the metal membrane 5. The function of the welding head 7 is therefore to weld these two metal sheets, thus forming the weld bead 51 and the accompanying layer of impurities or of oxidation 54. The welding head 7 is disposed upstream of the projection head 3 with respect to the displacement 22 of the support 2, in order for the projection head 3 to be able to project the laser beam 6 onto the weld bead 51 formed by the welding head 7, and thus proceed with the descaling of the weld bead 51 by eliminating from it the layer of impurities or of oxidation 54.

Just like the projection head 3, the welding head 7 is capable of pivoting in the clockwise direction 31 or the counterclockwise direction 32 when the join between two metal sheets of the metal membrane 5 is situated at the corrugation 52 of the metal membrane 5. This pivoting is possible by virtue of the arm 71 linking the welding head 7 to the support 2. The welding head 7 is also capable of performing a translational movement 73 in order to be able to follow the contour of the corrugation 52 of the metal membrane 5 while proceeding with the welding operation.

During the welding operation, the weld bead 51 formed is at a high temperature. It is necessary to wait for the temperature of the weld bead 51 to drop back below 150° C. before proceeding with the descaling thereof, in order to avoid creating new oxides in the descaling. That is why the welding arc 72 from the welding head 7 and the impact 61 of the laser beam 6 are separated by a distance 13 with respect to one another. This distance 13 is based on the speed of displacement 22 of the support 2, in order to allow a sufficient delay for the weld bead to pass below 150° C. between the moment when it is generated by the welding head 7 and the moment when it is descaled by the impact 61 of the laser beam 6. It has been established that, to avoid the creation of oxides in the descaling, the distance 13 must be greater than or equal to 80 mm.

FIG. 6 and FIG. 7 represent a fourth embodiment of the descaling device 1. In this embodiment, the descaling device 1 comprises two projection heads 3, each comprising its own means 11 allowing a movement of the projection head 3 with respect to the support 2. Thus, the projection device 1 comprises a first projection head 3a and a second projection head 3b. The first projection head 3a is configured to project a first laser beam 6a. Just like the preceding embodiments, the first projection head 3a can perform a pivoting movement through a first electric motor 23a and a first rotation shaft 21a. The second projection head 3b is configured to project a second laser beam 6b which can perform a pivoting movement through a second electric motor 23b and a second rotation shaft 21b. The first projection head 3a and the second projection head 3b are therefore identical or similar in structure and function.

When the descaling device 1 is operating in the flat section 55 of the metal membrane 5 as represented in FIG. 6, the first projection head 3a and the second projection head 3b are oriented such that their respective laser beams 6a and 6b extend to form a single point of impact 61, common to the two laser beams 6a and 6b. In other words, the means 11 allowing the movement of the two projection heads 3a, 3b place the latter in such a way that their laser beam 6a, 6b converge on the point of impact 61.

The two projection heads are oriented according to an angle of incidence that is identical, except for the direction of orientation of said angle of incidence. In other words, the first projection head 3a is inclined according to an angle of incidence oriented in the counterclockwise direction 32, whereas the second projection head 3b is inclined according to an angle of incidence with an angular value identical to the angle of incidence of the first projection head 3a, but turned in the clockwise direction 31.

When the descaling device 1 descales the corrugation 52 of the metal membrane as represented in FIG. 7, each of the laser beams 6a and 6b forms a distinct point of impact, respectively a first point of impact 61a and a second point of impact 61b. Given the orientation of the projection heads 3a and 3b, the first point of impact 61a covers the rising portion 521 of the corrugation 52 and the second point of impact 61b covers the descending portion 522 of the corrugation 52.

The first projection head 3a follows the profile of the rising portion 521 and the projection head 3b follows the profile of the descending portion 522, each observing an inclination according to the angle of incidence of between 5° and 70°. It is perfectly possible to envisage, for example using a sensor not represented in FIG. 7, temporarily stopping the emission of the first laser beam 6a during a pass on the descending portion 522 of the corrugation 52, and/or the emission of the second laser beam 6b on a pass on the rising portion 521 of the corrugation 52, and to do so in order to limit the energy consumption of the two projection heads 3a and 3b.

FIG. 8 represents a fifth embodiment of the descaling device 1. This is the only embodiment in which the projection head 3 does not include the reflection module. In this embodiment, the projection head 3 is linked to the support 2 in a fixed manner. In FIG. 8, the projection head 3 projects the laser beam 6, for example parallel to the rail 4 or to the metal membrane 5. The descaling device 1 comprises a reflecting device 8, for example a mirror, disposed on the trajectory of the laser beam 6 and on which the latter is reflected. The reflecting device 8 is disposed so as to project the laser beam 6 toward the weld bead 51, to the point of impact 61 of the laser beam 6 on the metal membrane 5.

In this embodiment, it is the reflecting device 8 which is linked to the rotation shaft 21, the latter establishing the mechanical link between the reflecting device 8 and the support 2. The rotation shaft 21 can be rotated by the electric motor 23 in order to pivot the reflecting device 8 and thus modify the trajectory of the laser beam 6 after reflection against the reflecting device 8. The point of impact 61 can then be moved in a way distinct from the displacement 22 of the support 2, and as a function of the pivoting of the reflecting device 8 in the clockwise direction 31 or in the counterclockwise direction 32. Thus, the means 11 allowing the movement of the point of impact 61 of the laser beam 6 on the metal membrane 5 is formed by the association between the rotation shaft 21 and the electric motor 23, but said means 11 allowing the movement drives the pivoting of the reflecting device 8 and not of the projection head 3, as is the case of the embodiments illustrated in FIGS. 1 and 3 to 7.

FIG. 9 and FIG. 10 represent a sixth embodiment of the descaling device 1, respectively by a front view and by a top view. This embodiment is suited to a metal membrane 5 comprising at least two metal strips joined to one another by at least one raised edge 53. In this example, the metal strips are made of an alloy of iron with 36% nickel, a material that is particularly sensitive to oxidation.

In this embodiment, it is the raised edge 53 which acts as the rail of the descaling device 1. The raised edge 53 is formed by a band folded to a right angle, so as to bear on the band of the immediately adjacent metal strip.

The support 2 of the descaling device 1 takes the form of a gantry 9 which overhangs the metal membrane 5. In FIG. 9, the gantry 9 comprises two uprights 94 which each comprise a base 95 placed resting on the metal membrane 5. Each upright 94 extends primarily on the vertical axis V and one of the ends of the upright 94 is in direct contact with the base 95. The base 95 has a notch 96 configured to accommodate the raised edge 53.

The base 95 also comprises a driving member 91 in its structure. The driving member 91 comprises at least one wheel 93 and one roller 92, respectively represented by dotted and by solid lines in FIG. 9. The wheel 93 has a cylindrical form with an axis of rotation parallel to the vertical axis V, for example a direction at right angles to a majority plane of the metal membrane 5 and parallel to a plane containing the raised edge 53. The wheel 93 is in direct contact with the raised edge 53 and rolls thereon. Thus, the cooperation between the wheel 93 and the raised edge 53 ensures the securing and/or guiding function between the rail, here the raised edge 53, and the support, here the gantry 9. The driving member 91 comprises an electrical supply, not represented in FIG. 9, configured to drive the rotation of the wheel 93 about its axis of rotation.

The roller 92 also has a cylindrical form whose axis of rotation is parallel to the general plane of extension of the metal membrane 5 and at right angles to a plane containing the raised edge 53. The roller 92 is in direct contact with the metal membrane 5 and bears the descaling device 1, when the latter is placed on a horizontal plane. When the driving member 91 is activated, the wheel 93 starts rotating and drives the rotation of the roller 92. Since the roller 92 is the sole direct contact between the gantry 9 and the flat section 55 of the metal membrane 5, it is the roller 92 which, by rotation against the flat section 55 of the metal membrane 5, guarantees the displacement 22, visible in FIG. 10, of the gantry 9 along the metal membrane 5.

By virtue of the contact of the wheel 93 against the raised edge 53, the gantry 9 is displaced parallel to the raised edge 53. Moreover, since the gantry 9 here comprises a driving member 91 for each base 95, each of the driving members 91 is parameterized to drive an identical rotation of the wheels 93 in order for the speed of the gantry 9 to be equal for each of the bases 95. The gantry 9 can apply the displacement 22 at a constant speed or step by step.

Each of the ends of the uprights 94 opposite the bases 95 are linked together by a runner 10, extending primarily on the transverse axis T. The runner 10 serves as mechanical guide for a mechanical arm 18 linked to the projection head 3, as visible in FIG. 10, in order to create a longitudinal offset of the projection head 3 on the longitudinal axis L. Thus, the projection head 3 is maintained above the metal membrane 5 and can project the laser beam 6 onto the latter.

As visible in FIG. 10, the descaling device 1 comprises a translation device 101 for translating the projection head 3, producing a link between the two uprights 94. This translation device 101 extends at the runner 10 level, parallel thereto. The translation device 101 runs right through the mechanical arm 18, the latter bearing the projection head 3. Thus, through the mechanical arm 18, the translation device 101 ensures the displacement of the projection head 3. The translation device 101 can for example be a worm screw 35, capable of cooperating with a toothed wheel 33 secured to the mechanical arm 18. The toothed wheel 33 can for example be a nut and can be rotated by any suitable device. Alternatively, the worm screw 35 can be rotated and thus induce a translation of the mechanical arm 18, and, consequently of the projection head 3, between the two uprights 94. The mechanical arm 18 and the projection head 3 are thus capable of moving along the translation device 101 by a transverse movement 12. The transverse movement 12 of the projection head 3 along the runner 10 allows the point of impact 61 of the laser beam 6 to sweep the metal membrane 5 by performing transverse to-and-fro movements, these to-and-fro movements being performed according to the transverse movement 12. Thus, the point of impact 61 of the laser beam 6 descales the metal membrane 5 according to the movement distinct from the displacement 22 of the gantry 9 serving as support in this embodiment. Such a movement is allowed by the means 11 formed by the association between the translation device 101 and the toothed wheel 33. Moreover, the projection head 3 also comprises the reflection module, not visible in FIGS. 9 and 10, in this embodiment. The reflection module, by virtue of a deflection of the trajectory of the laser beam 6, allows the raised edge 53 of the metal membrane 5 to be descaled. Such descaling is possible when the projection head 3 is situated at one of the ends of the translation device 101, as is represented by dotted lines on the left in FIG. 9 and on the left in FIG. 10. The reflection module thus allows the descaling device 1 to descale the raised edge 53 of the metal membrane 5 despite the fact that the projection head 3 is not vertically centered at the raised edge 53 on the vertical axis V. Furthermore, the mechanical arm 18 ensures the longitudinal offset of the projection head 3 in order for the gantry 9 not to form an obstacle to the laser beam 6 for the descaling of the raised edge 53.

Another dotted-line representation of the projection head 3 and of the mechanical arm 18 is visible on the right in FIG. 10. It can be seen therein that the reflection module allows the point of impact of the laser beam 6 to be set in motion over all of an impact surface 19 of the metal membrane 5. The impact surface 19 is represented by dotted lines and also includes the raised edge 53 of the metal membrane 5. The impact surface 19 delimits a zone of movement of the point of impact 61 of the laser beam 6 when the projection head 3 is at the position of the dotted-line representation on the right in FIG. 10. The point of impact 61 of the laser beam 6 can thus, by virtue of the reflection module, be moved by a longitudinal movement L1 and/or by a transverse movement T1 within the impact surface 19.

The transverse movement 12 of the projection head 3 associated with the displacement 22 of the gantry 9 allows the metal membrane 5 to be descaled. It is possible to imagine the descaling of the metal membrane 5 in several steps. First of all, the projection head 3 performs at least one transverse movement 12 along the entirety of the translation device 101 in order for the point of impact 61 of the laser beam 6 to cover a transverse section of the metal membrane 5. Then, the gantry 9 performs the displacement 22 in order to offset the projection head 3 longitudinally. The step of transverse movement 12 of the projection head 3 is then repeated for the point of impact 61 of the laser beam 6 to cover another transverse section of the metal membrane, adjacent to the one which was descaled previously. The gantry 9 once again performs the displacement 22, and so on until the metal membrane 5 is entirely descaled. The descaling can be performed along a longitudinal distance as long as the gantry 9 is secured to the raised edge or edges 53. The steps can be repeated in that way one after the other, resulting in a transverse to-and-fro movement of the projection head 12, while at the same time the latter advances along the metal strip. It is also possible, after parameterizing the speed of displacement of the descaling device 1, to ensure that the speed of the transverse movement 12 is higher than the speed of displacement 22 of the support with respect to the membrane 5. Thus, the projection head 3 can be displaced at a speed that is fast enough to descale all of the metal membrane 5 while the gantry 9 is displaced continually. During the descaling operation, the projection head 3 is maintained with a constant separation 17 from the metal membrane 5, the movement of the projection head 3 being transversal and the descaling device 1 descaling the flat section 55 of the metal membrane 5.

Obviously, the invention is not limited to the examples which have just been described and many provisions can be added to these examples without departing from the scope of the invention.

The invention, as has just been described, clearly achieves the aim that was set for it, and makes it possible to propose a descaling device for a tank for transporting and/or storing gas in liquid form, comprising a rail, a support and a projection head projecting a laser beam, as well as a means allowing a movement of a point of impact of the laser beam with respect to the membrane that is distinct from the displacement of the support. Variants not described here could be implemented without departing from the context of the invention, provided that, in accordance with the invention, they comprise a descaling device that conforms to the features of the invention.

The invention claimed is:

1. A descaling device for descaling a metal membrane of a tank for at least one of transporting or storing gas in liquid form comprising:

a rail configured to be secured to the metal membrane, a projection head for projecting a laser beam configured to descale the metal membrane, and a support interposed between the projection head and the rail and configured to be continually displaced along the rail, wherein the descaling device comprises a means allowing a movement, with respect to the metal membrane, of a point of impact of the laser beam on the metal membrane, the movement being distinct from a displacement applied by the support on the rail, and wherein the means allowing the movement of the point of impact is configured to incline the projection head according to an angle of incidence of between 5° and 70° with respect to a normal to the metal membrane.

2. The descaling device as claimed in claim 1, wherein the projection head is configured to project the laser beam at a power of between 20 W and 200 W.

3. The descaling device as claimed in claim 1, wherein the projection head is configured to project the laser beam at a pulsing frequency of between 100 kHz and 250 kHz.

4. The descaling device as claimed in claim 1, wherein the projection head is configured to project the laser beam at a wavelength of 1064 nm +/−5%.

5. The descaling device as claimed in claim 1, wherein the projection head comprises a focusing lens for focusing the laser beam.

6. The descaling device as claimed claim 5, wherein a focal distance of the focusing lens for focusing the laser beam is between 80 mm and 360 mm.

7. The descaling device as claimed in claim 1, wherein the support is configured to be displaced on the rail at a speed of between 25 and 72 cm/min.

8. The descaling device as claimed in claim 1, wherein the means allowing the movement of the point of impact is configured so that the projection head follows a profile complementing a profile of the metal membrane.

9. The descaling device as claimed in claim 1, wherein the means allowing the movement of the point of impact comprises a reflection module disposed within the projection head and ensuring the movement of the point of impact in at least two different planes.

10. The descaling device as claimed in claim 1, wherein the projection head is configured to adopt a fixed position of inclination with respect to the normal to the metal membrane.

11. The descaling device as claimed in claim 1, configured to descale a weld bead of the metal membrane.

12. The descaling device as claimed in claim 11, wherein the means allowing the movement of the point of impact comprises a reflecting device on which the laser beam from the projection head is reflected toward the metal membrane.

13. The descaling device as claimed in claim 1, wherein the support bears a welding head.

14. The descaling device as claimed in claim 13, wherein the means allowing the movement of the point of impact is configured to separate the point of impact of the laser beam from a welding arc formed by the welding head by a distance greater than or equal to 100 mm.

15. The descaling device as claimed in claim 1, wherein the metal membrane comprises a corrugation, the means allowing the movement of the point of impact being configured so that the projection head follows a profile of the corrugation of the metal membrane.

16. The descaling device as claimed in claim 1, wherein the support includes a gantry overhanging the metal membrane.

17. The descaling device as claimed claim 16, wherein the metal membrane comprises at least two metal strips joined to one another by a raised edge, the rail being formed by the raised edge, the projection head being configured to descale the raised edge.

18. The descaling device as claimed in claim 16, wherein the support is driven along the rail by a driving member comprising a wheel bearing against the rail and a roller bearing on a flat section of the metal membrane.

19. The descaling device as claimed in claim 16, wherein the means allowing the movement of the point of impact comprises a translation device for translating the projection head on a runner interposed between two uprights of the gantry.

* * * * *